United States Patent [19]
White et al.

[11] Patent Number: 5,624,011
[45] Date of Patent: Apr. 29, 1997

[54] STEER AXLE BRAKE ASSEMBLY

[76] Inventors: Jay D. White, 9445 Treetop Dr., Galesburg, Mich. 49053; Mark A. Davis, 7415 Arborcrest, Portage, Mich. 49002

[21] Appl. No.: 629,451

[22] Filed: Apr. 10, 1996

Related U.S. Application Data

[63] Continuation of Ser. No. 407,567, Mar. 21, 1995, abandoned.

[51] Int. Cl.⁶ .................................................. B62D 7/18
[52] U.S. Cl. .................................... 188/329; 280/96.1
[58] Field of Search ............................. 188/326–329, 188/334, 206 A, 206 R, 234; 280/96.1; 301/105.1

[56] References Cited

U.S. PATENT DOCUMENTS

| | | |
|---|---|---|
| 1,755,627 | 4/1930 | Bijur. |
| 2,885,035 | 5/1959 | Rubly .................... 188/206 R |
| 3,497,037 | 2/1970 | Deibel .................... 188/329 |
| 4,245,725 | 1/1981 | Kurita et al. ............ 188/326 |
| 4,552,254 | 11/1985 | Baltare ................... 188/206 A |
| 4,693,487 | 9/1987 | Cooper ................... 280/96.1 |
| 4,761,019 | 8/1988 | Dubensky ............... 280/674 |
| 4,905,800 | 3/1990 | Mathews ................. 188/329 |
| 5,219,176 | 6/1993 | Mitchell ................. 280/96.1 |

FOREIGN PATENT DOCUMENTS 2002650  11/1993  Russian Federation ............. 280/96.1

*Primary Examiner*—Robert J. Oberleitner
*Assistant Examiner*—Chris Schwartz

[57] ABSTRACT

A pair of arcuate brake shoes in a vehicle brake assembly are pivotably supported on a pivot pin which is directly mounted to a steering knuckle add activated by an S-cam type actuator where an S-cam actuator shaft is supported in a support tube which is attached directly to the steering knuckle thereby eliminating the traditional brake spider. Rotation of the S-cam causes a pair of cam followers to separate the brake shoes resulting in frictional contact between the brake shoes and a brake drum. Elimination of the brake spider to support the pivot pin and the S-cam actuator shaft housing reduces complexity for lower cost and improved performance.

13 Claims, 4 Drawing Sheets

STEER AXLE BRAKE ASSEMBLY

This application is a continuation of application Ser. No. 08/407,567 filed on Mar. 21, 1995, now abandoned.

BACKGROUND OF THE INVENTION

1. Field of the Invention

The present invention relates to a brake and steering knuckle assembly for a steer axle on a medium or heavy duty truck. More specifically, the present invention relates to a brake and steering knuckle assembly for the steer axle on a medium or heavy duty truck where the steering knuckle provides for the direct support of the brake shoes and brake activation device without a brake spider.

2. Description of the Prior Art

It is well known in the prior art to use an "S-cam" to actuate a pair of arcuate brake shoes to contact the inner surface of a brake drum to provide a frictional braking force to a vehicle wheel assembly. Although the present invention is not strictly limited to rotary cam brakes of the S-cam type, but could be used with various other configurations of rotary cam brakes, the invention is especially advantageous when used with S-cam expanding internal shoe drum brakes, and will be described in connection therewith. An example of a typical S-cam expanding internal shoe drum brake is disclosed in U.S. Pat. No. 4,905,800 assigned to the assignee of the present invention and incorporated herein by reference. Traditionally, the brake shoes and the rest of the braking components making up the brake assembly are mounted to what is known in the art as a "brake spider" which is attached to the steer knuckle and supports the brake shoes and the S-cam actuation device.

It is desirable to minimize the overall package of the brake assembly to facilitate placement within the confines of the vehicle wheel while providing for the required braking performance in extreme conditions. It is also desirable to minimize the number of components required to provide for the braking function thereby minimizing complexity, weight and expense. Thus, elimination of the brake spider is desirable for many practical reasons.

Attachment of the tie-rod arm and the steering arm in a traditional steering knuckle assembly by threaded fasteners results in packaging problems with the brake camshaft assembly, a relatively high weight-to-strength ratio, and a significant increase in steering system deflection. The relative motion that can occur with or without input from the driver resulting in undesired steering inputs into the wheel assembly. There is commonly available a steering knuckle for heavy duty motor vehicles such as trucks, wherein the steering arm and the tie-rod are fitted to the steering knuckle by means of a threaded portion in a fastening nut. There is a need in the heavy duty motor vehicle field to provide a steering knuckle assembly wherein the tie-rod arm and the steering arm are integrally formed as a one piece unit with the steering knuckle. This configuration would result in higher strength-to-weight ratio, improved brake assembly packaging and more accurate steering of the vehicle by improving the integrity of the connection between the tie-rod arm, the steering arm, and the knuckle. An example of such a steering knuckle is described in U.S. Pat. No. 5,219,176 the disclosure of which is hereby incorporated by reference. These heavy duty steering knuckles also employ flange body to which a separately attached brake spider unit for connection to the brake assembly as previously discussed.

SUMMARY OF THE INVENTION

The present invention allows for the elimination of the brake spider thereby reducing the number of components required to provide for the vehicle braking function while minimizing weight and packaging requirements for enhanced overall vehicle performance. Also, the steering arm and tie-rod arm are forged as one piece with the steering knuckle to provide for increased stiffness and integrity thereby providing for the more accurate steering of the vehicle in response to driver input and reduced weight.

The S-cam brake actuator and the arcuate brake shoes are mounted directly to the steering knuckle using the technique of the present invention. The brake activation method shown herein utilizes an S-cam attached to an actuator rod which is supported and rotates in an actuator rod housing where the rod housing is attached directly to the steering knuckle, as opposed to the prior art brake spider, thereby providing for the support and actuation of a pair of arcuate brake shoes. The arcuate brake shoes rotate on and are pivotably fixed at one end to a lower pivot pin which is also attached directly to the steering knuckle and at the opposite end are separated by rotation of the S-cam thereby providing for the direct support of the arcuate brake shoes without the use of a brake spider.

A one-piece steering knuckle assembly is described in U.S. Pat. No. 5,219,176 wherein the tie-rod arm and the steering arm are formed as one piece with the steering knuckle thereby providing for increased stiffness and reduced weight of the vehicle steering system. However, there is no provision for the direct mounting of the brake assembly directly to the steering knuckle as is disclosed in the present invention.

One provision of the present invention is to provide a compact brake assembly by eliminating the use of a brake spider to support the brake components.

Another provision of the present invention is to provide a compact brake assembly where the actuator shaft housing is mounted directly to a steering knuckle.

Another provision of the present invention is to provide a compact brake assembly where the actuation shaft housing is mounted directly to a brake knuckle and a lower pivot pin is also mounted directly to a steering knuckle.

Still another provision of the present invention is to provide for a brake assembly having a reduced number of parts using an actuator means supported by a steering knuckle to cause the expansion of a pair of arcuate brake shoes rotating and supported by a lower pivot pin which is also attached directly to the steering knuckle.

DETAILED DESCRIPTION OF THE PREFERRED EMBODIMENT

Figure 1:
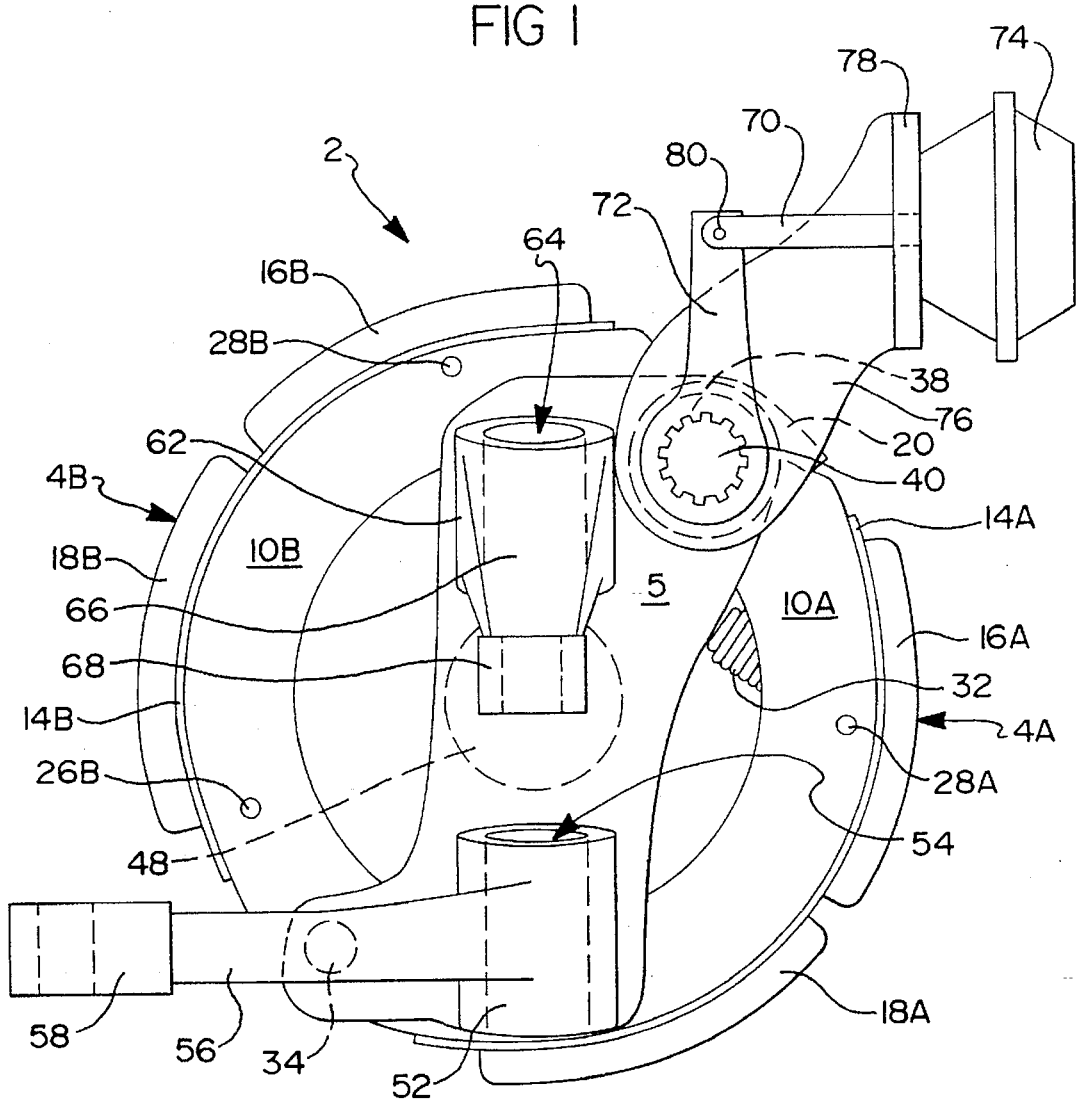
FIG. 1 is a plan view of the inboard side of an S-cam expanding internal shoe drum brake assembly and one-piece steering knuckle of the present invention.

In this disclosure, certain terminology will be used for convenience and reference only and will not be limiting. For example, the terms "forward" and "rearward" will refer to directions forward and rearward of the brake assembly as installed in a vehicle. The terms "rightward" and "leftward" will refer to directions in the drawings in connection with which the terminology is used. The terms "inwardly" and "outwardly" will refer to directions toward and away from, respectively, the geometrical center of the brake assembly of the present invention. The terms "upward" and "downward" will refer to directions as taken in the drawings in connection with which the terminology is used. All foregoing terms include the normal derivatives and equivalents thereof. The term "brakes" as used herein is intended to include drum type brakes using all types of actuation methods.

Figure 2:
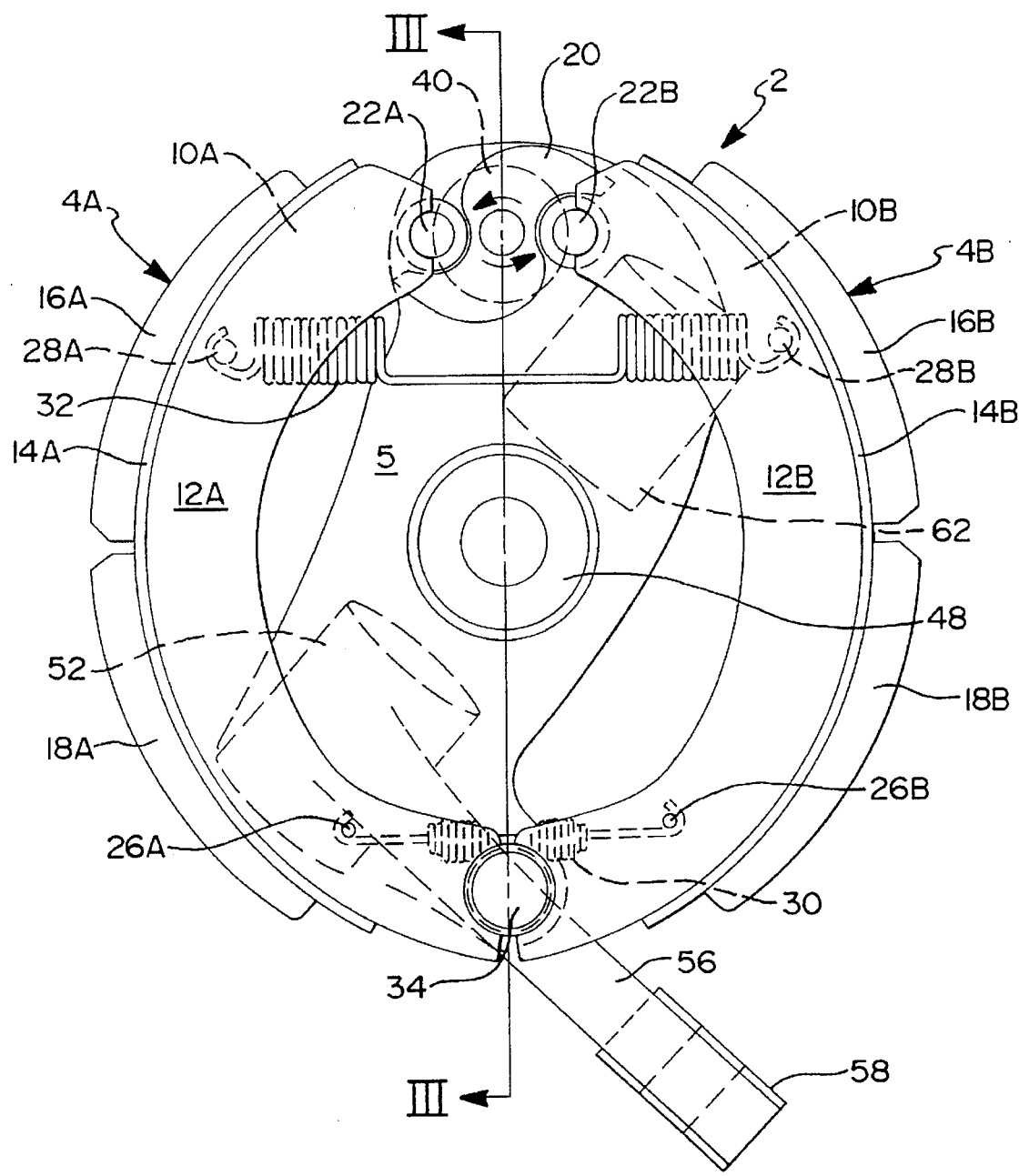
FIG. 2 is a plan view of the outboard side of the S-cam expanding internal shoe drum brake assembly and one-piece steering knuckle of the present invention.

Now referring to FIG. 1 and FIG. 2, FIG. 1 is a plan view of the inboard side of the brake assembly and steering knuckle of the present invention while FIG. 2 is a plan view of the outboard side of the brake assembly and steering knuckle of the present invention. FIG. 1 shows a left brake shoe assembly 4A and a right brake shoe assembly 4B mounted directly to a steering knuckle 5 without the use of a traditionally used brake spider to mount a brake assembly to a steering knuckle. The left brake shoe assembly 4A is comprised of a left inner web 10A which, in conjunction with a left outer web 12A, are attached to and support the left brake table 14A. The left brake table 14A provides support for the left upper brake shoe 16A and the left lower brake shoe 18A which, when considered as one unit, comprises the left brake shoe assembly 4A. Likewise, the right brake shoe assembly 4B is comprised of a right inner web 10B which acts in conjunction with a right outer web 12B to support the right brake table 14B. Attached to the right brake table 14B is the right upper brake shoe 16B and the right lower brake shoe 18B which together comprise the right brake shoe assembly 4B.

The S-cam 20 is rotated by the axial movement of an actuator rod 70 from actuator 74 which is usually powered by air pressure on a heavy duty truck application. The actuator rod 70 is coupled by a pin joint 80 to a lever 72 which is in turn coupled to an actuator shaft 40 which is attached to and rotates the S-cam 20. Thus, the supply of a pressure signal to the actuator 74 causes the actuator rod 70 to axially extend thereby causing the actuator shaft 40 to be rotated by lever 72. A bracket 76 is used to support the actuator 74 and is attached to the steering knuckle 5 by welding or other appropriate attachment means. Rotation of the S-cam 20 causes the left brake shoe assembly 4A to increase in separation distance from the right brake shoe assembly 4B causing them to contact the brake drum (not shown) resulting in a frictional interaction with the drum. The left upper brake shoe 16A, the right upper brake shoe 16B, the left lower brake shoe 18A and the right lower brake shoe 18B contact the inside surface of the brake drum thereby resulting in a braking action to the rotation of a vehicle wheel attached to the brake drum.

The left brake shoe assembly 4A and the right shoe brake assembly 4B are supported directly on the steering knuckle 5 through a pivot pin 34 at one end and a left roller 22A and a right roller 22B at an opposite end. In an alternate embodiment, the pivot pin 34 can be split into two pivot pins, one for each respective brake shoe assembly. The S-cam 20 contacts the left roller 22A and the right roller 22B thereby causing the left brake shoe assembly 4A and right brake shoe assembly 4B to become increasingly separated as the S-cam 20 is rotated. The left roller 22A engages the left inner web 10A and the left outer web 12A and the right roller 22B engages the right inner web 10B and the right outer web 12B. Movement of the left and right rollers 22A and 22B causes a separation of the left and right brake shoe assemblies 4A and 4B where both the left brake shoe assembly 4A and right brake shoe assembly 4B pivot on the pivot end 34.

A return spring 32 is attached to the left brake shoe assembly 4A at the left return spring pin 28A and to the right brake shoe assembly 4B at the right return spring pin 28B. The return spring 32 urges the left brake shoe assembly 4A towards the right brake shoe assembly 4B thereby reducing the overall outside diameter of the brake assembly 2 to prevent contact with the brake drum where a braking action is not desired.

The steering knuckle 5 is usually made using a well known forging process which results in the formation of a spindle 48 which extends outwardly to support the brake drum and wheel. In the present invention, a steering arm 66 is formed as one piece with the steering knuckle 5 extending from an upper king pin boss 62 which has an upper king pin pilot 64 formed therein and a steering arm attachment boss 68 is formed in the opposite end of a steering arm 66 providing for attachment to the steering linkage (not shown). In axial alignment with the upper king pin boss 62 is a lower king pin pilot 54 formed in the lower king pin boss 52 which is formed with as one piece with the steering knuckle 5. A tie-rod arm 56 having a tie-rod attachment boss 58 is also formed as one piece with the steering knuckle 5. The tie-rod attachment boss 58 is formed on a far end of the tie-rod arm 56 for attachment to a steering tie-rod (not shown). The manufacture of the steering knuckle 5 including as a one piece forging a steering arm 66 and a tie-rod arm 56 provides for exceptional stability and stiffness for attachment to the steering linkage for accurate control of the positioning of the vehicle wheel.

Also extending directly from the steering knuckle 5 are both the pivot pin 34 and the support tube 38 thereby providing for the support of the actuator shaft 40 which is attached to the S-cam 20. Thus according to the present invention, there is no need for a prior art brake spider thereby reducing parts count, cost and complexity. Traditionally, the brake spider is bolted to the steering knuckle 5 and provides a support for both the left and right brake shoe assemblies 4A and 4B thereon.

Now referring specifically to FIG. 2, a plan view of the inboard side of the brake assembly 2 and the steering knuckle 5 of the present invention more clearly illustrates the function of the return spring 32. The return spring 32 is attached to the left brake shoe assembly 4A at the left return spring pin 28A and at an opposite end at the right brake shoe assembly 4B at the right return spring pin 28B thereby slightly extending the return spring 32 from its free length. The return spring 32 provides for the loading of the left and right roller 22A and 22B respectively against the S-cam 20. The retention spring 30 is used to maintain contact between the pivot pin 34 and the left outer web 12A and the right outer web 12B of left brake shoe assembly 4A and likewise to maintain contact between the left inner web 10A and right inner web 10B of the right brake shoe assembly 4B against the pivot pin 34. The retention spring 30 is connected to the left brake shoe assembly 4A at the left spring pin 26A and to the right brake shoe assembly 4B at the right spring pin 26B.

Figure 3:
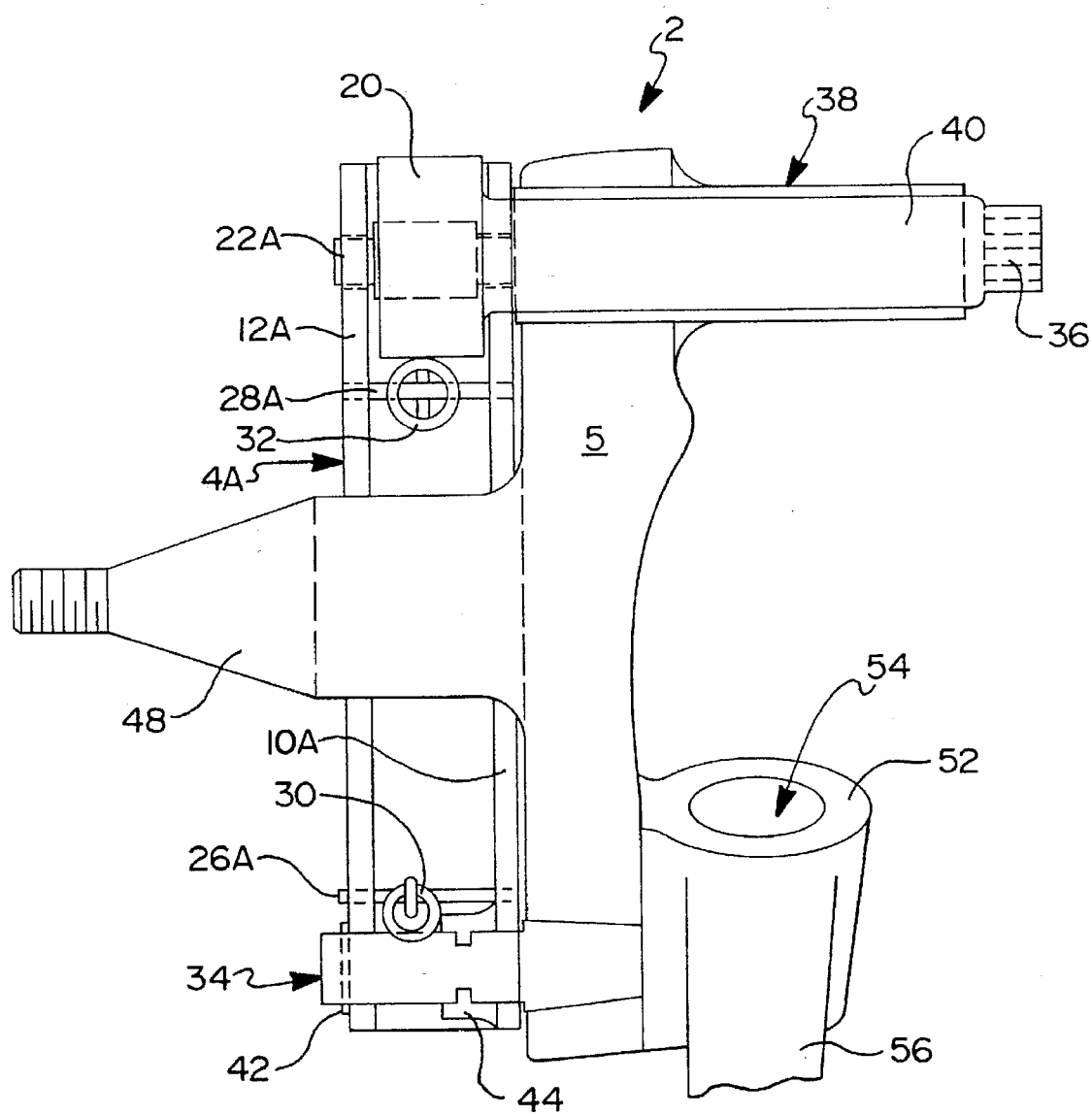
FIG. 3 is a cross-sectional front view of the S-cam brake assembly and steering knuckle of the present invention taken along line III—III of FIG. 2.

Now referring to FIG. 3 of the drawings, a cross-sectional view of the brake assembly 2 and steering knuckle 5 of the present invention taken along lines III—III of FIG. 2 is shown. The actuator shaft 40 is supported within the support tube 38 where the support tube 38 is nonrotatably attached to the steering knuckle 5 by pressing or welding or using any other appropriate attachment means. In an alternate embodiment, a support boss 84 (see FIGS. 4 and 5) is formed on the inside of the steering knuckle 5 surrounding and providing direct support to the actuator shaft 40 thereby eliminating the need for the support tube 38.

The support tube 38 is pressed or otherwise retained in an aperture formed in the steering knuckle 5 during the manufacturing process. In a similar manner, the pivot pin 34 is pressed or otherwise retained such as shown in FIG. 3 where the pivot pin 34 has a tapered section engaging a matched tapered section formed in the steering knuckle 5 to provide the appropriate location and support for the left brake shoe assembly 4A and the right brake shoe assembly 4B much as in the traditional manner when using a brake spider. In the prior art, the support tube 38 and the pivot pin 34 would be fastened securely to a brake spider which would in turn be bolted directly to the steering knuckle 5. With the use of the present invention, the brake spider is eliminated and the support tube 38 and the pivot pin 34 are secured directly to the steering knuckle 5 thereby reducing expense, complexity, weight and packaging requirements.

Rotation of the S-cam 20 against the left roller 22A causes the left brake shoe assembly 4A to be displaced outward against the force of the return spring 32. One end of the return spring 32 is attached to the left return spring pin 28A which is supported in the left outer web 12A and the left inner web 10A of the left brake shoe assembly 4A. Likewise, the other end of the return spring 22 is attached to the right return spring pin 28B which is supported in the right outer web 12B and the right inner web 10B of the right brake shoe assembly 4B.

The retention spring 30 maintains the left and right brake shoe assemblies 4A and 4B in position on the pivot pin 34. More clearly shown is the pivot pin 34 which is attached to the steering knuckle 5 and supports the left brake shoe assembly 4A at the left inner web 10A and the left outer web 12A. The left brake shoe assembly 4A is held in position on pivot pin 34 with a retention clip 42 and a retention collar 44. The retention clip 42 can be one of a variety of common clip designs such as a "circlip". The retention collar 44 can be made of a resilient type of material which provides for frictional damping of the left brake shoe assembly 4A to prevent or reduce the level of brake squeal. Although it is not shown in FIG. 3, the right brake shoe assembly is held on the pivot pin 34 in an identical manner.

Also shown is the spindle 48 which extends and is formed from the steering knuckle 5 upon which the bearings of the brake drum are piloted. Also shown as formed as one piece with the steering knuckle 5 is the king pin boss 52 having a tie-rod arm 56 extending therefrom.

Figure 4:
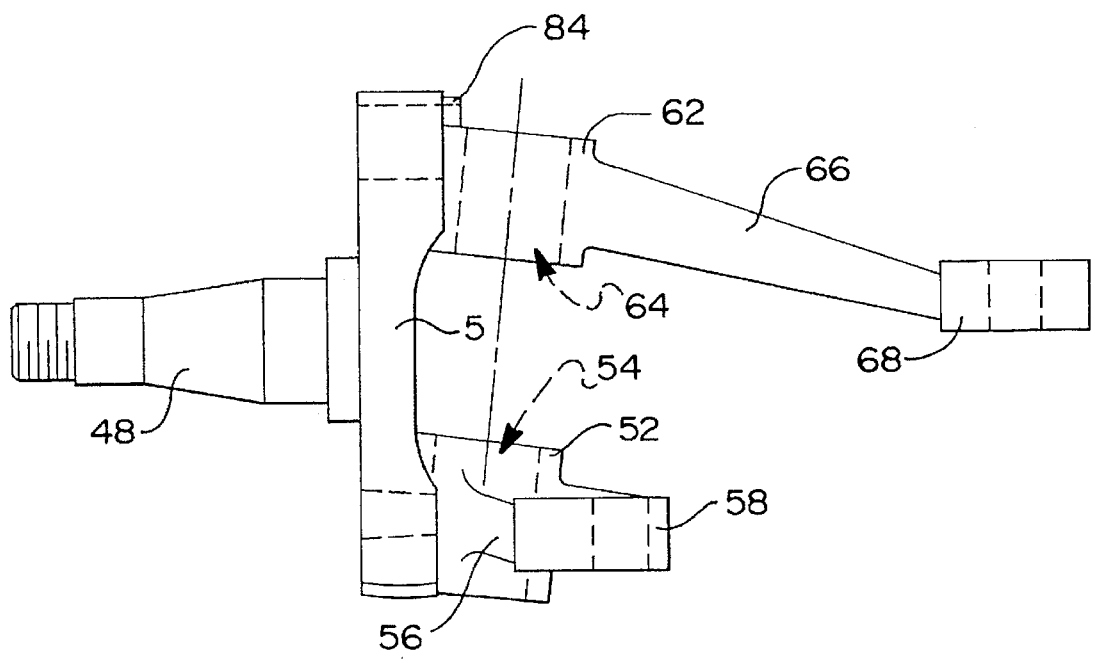
FIG. 4 is a front plan view of the one-piece steering knuckle of the present invention.

Now referring to FIG. 4, a frontal view of the one-piece steering knuckle 5 of the present invention is shown where the steering arms 66 and the tie-rod arms 56 are formed as one piece with the upper king pin boss 62 and the lower king pin boss 52 respectively. Thus, the steering knuckle 5 as shown in FIG. 4 is made as a one-piece forging with subsequent machining operations to form the spindle 48, the lower king pin pilot 54 and the upper king pin pilot 64. Also, the tie-rod attachment boss 58 and the steering arm attachment boss 68 are formed and drilled for subsequent fitting of a steering arm and a tie-rod arm. Support boss 84 is formed in the one-piece steering knuckle 5 to rotatably support the actuator shaft 58. Shown as phantom lines are the apertures for the support tube 38 and the pivot pin 34.

Figure 5:
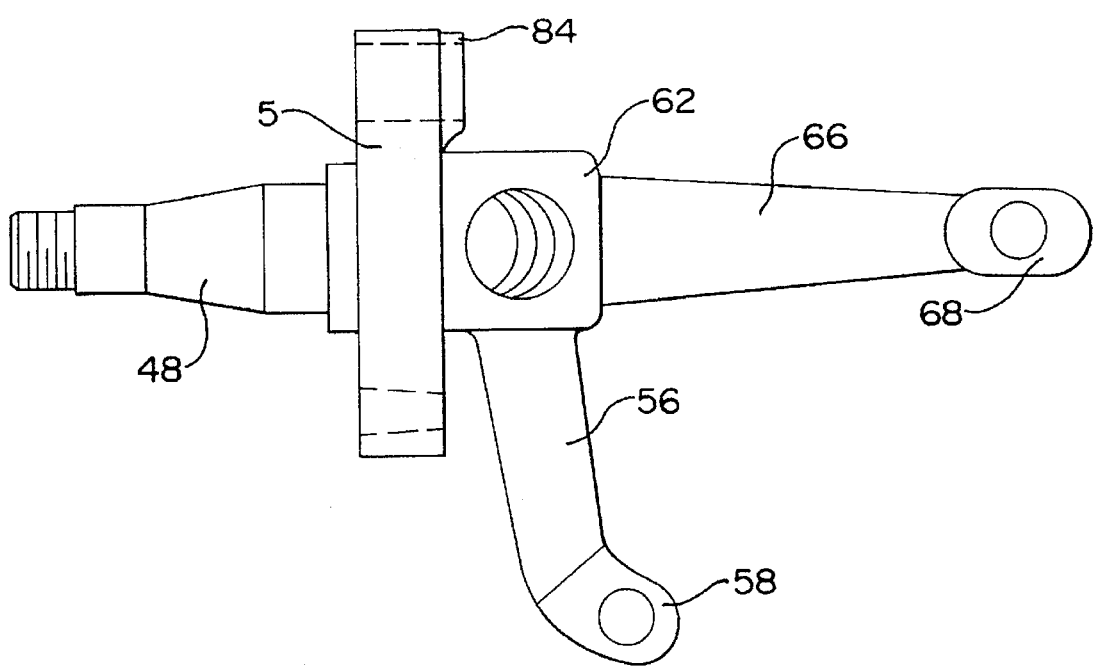
FIG. 5 is a top plan view of the one-piece steering knuckle of the present invention.

FIG. 5 is a top plan view of the steering knuckle of the present invention, as shown in FIG. 4, more clearly illustrating the configuration of the tie-rod arm 56 and the steering arm 66 attached to the upper and lower king pin boss 62 and 52 respectively. While the steering arm 66 and the tie-rod arm 56 are shown as certain geometric positions respect to the steering knuckle 5 and the spindle 48, is obvious that they can take various forms and angles with respect thereto. Also, there may or may not be a steering arm.

In general, the present invention provides a one-piece steering knuckle assembly for heavy commercial vehicles, such as trucks, constructed and arranged to receive and activate a brake shoe assembly without the use of a brake spider. A wheel spindle extends from the steering knuckle to support a brake drum and wheel. A tie-rod arm and a steering arm are formed with the steering knuckle as a one-piece forging. The steering knuckle is formed, according to the present invention, as one piece including an upper and lower king pin boss and tie-rod arm and steering arm. In this manner, the steering knuckle and the tie-rod arm and the steering arm are especially rigid thereby providing for the accurate control of wheel angle during the steering of a heavy duty truck. Steel is the preferred metal used in forging a billet into the unitary steering knuckle.

Although this invention has been described in its preferred form with a certain degree of particularity, it is understood that the present disclosure of the preferred embodiments has been made only by way of example, and that numerous changes in the detailed construction and combination and arrangement of the parts may be resorted to without departing from the spirit and the scope of the invention, as hereinafter claimed.

We claim:

1. A vehicle brake assembly comprising a pair of arcuate pivotably mounted brake shoes, located interiorly of a brake drum each of said brake shoes carrying a cam follower urged into direct engagement with an S-cam rotated by an actuator shaft, rotation of said S-cam in a first direction of rotation from a fully disengaged condition forcing at least one of said brake shoes radially outward relative to said brake drum, said brake assembly further comprising:

a steering knuckle disposed adjacent to said brake shoes, said steering knuckle having an axle spindle axially extending between said brake shoes and having both an upper king pin boss and a lower king pin boss where a steering arm is formed directly from said upper king pin boss and a tie-rod arm is formed directly from said lower king pin boss;

at least one pivot pin mounted directly to said steering knuckle and contacting and pivotably supporting said brake shoes;

a support tube rotatably supporting said actuator shaft, said support tube directly attached to said steering knuckle.

2. The vehicle brake assembly of claim 1, further comprising a retention ring encircling said pivot pin and disposed adjacent to a brake web section of each of said brake shoes, said retention ring preventing substantial axial movement of said brake shoes.

3. The vehicle brake assembly of claim 2, wherein said retention ring engages a circumferential retention groove formed in said pivot pin.

4. The vehicle brake assembly of claim 1, wherein said pivot pin has a tapered section engaging a matched tapered section formed in said steering knuckle.

5. A brake assembly for a vehicle steer axle comprising:

a steering knuckle having an axle spindle extending therefrom for supporting and steering a vehicle, said steering knuckle having an upper king pin boss and a lower king pin boss and a steering arm formed directly from said upper king pin boss and a tie-rod arm formed directly from Said lower king pin boss;

at least one pivot pin directly attached to said steering knuckle;

a pair of arcuate brake shoes having first and second ends, said first ends pivotably supported on said pivot pin;

a pair of roller followers rotatably supported by said second ends of said brake shoes;

an S-cam rotated by an actuator shaft supported in an actuator support tube, where said support tube is secured directly in said steering knuckle, said S-cam disposed to contact said roller followers;

wherein said S-cam is rotated by said actuator shaft and urged into engagement with said roller followers thereby forcing at least one of said brake shoes to pivot on said pivot pin and thereby move radially outward to frictionally engage a brake drum.

6. The brake assembly of claim 5, further comprising a retention ring engaging said pivot pin and contacting said first ends of said brake shoes thereby retaining said brake shoes on said pivot pin.

7. The brake assembly of claim 6, wherein said retention ring engages a circumferential retention groove formed in said pivot pin.

8. The brake assembly of claim 5, wherein said pivot pin has a tapered section engaging a mating tapered section formed in said steering knuckle.

9. The brake assembly of claim 5, wherein a retention device is attached to said pivot pin adjacent to said brake shoes to retain said brake shoes on said pivot pin.

10. A brake shoe assembly having a pair of arcuate brake shoes supported on said S-cam at one end and supported by at least one pivot pin at an opposite end and an actuator shaft rotatable in a support tube, said actuator shaft having an S-cam attached to a first end and an actuator lever at a second end; a return spring having one end attached to one of said brake shoes and a second end attached to a second end of said brake shoes so as to urge said pair of brake shoes toward one another and a steering knuckle having an upper king pin boss attached directly to the steering knuckle and a lower king pin boss attached directly to the steering knuckle and aligned with said upper king pin boss; and a steering arm formed directly from said upper king pin boss and a tie-rod arm formed directly from said lower king pin boss; and a spindle formed from said steering knuckle and extending axially to rotationally support a brake drum for a heavy duty truck, the improvement comprising:

said support tube directly attached to said steering knuckle and passing through an aperture formed in said steering knuckle; and said pivot pin attached to the steering knuckle radially opposite said support tube.

11. The brake shoe and steering knuckle assembly of claim 10, further comprising, an actuator having an actuator rod attached to said actuator lever for causing said actuator shaft to rotate thereby causing said S-cam to separate said brake shoes.

12. A vehicle brake assembly comprising a pair of arcuate pivotably mounted brake shoes located interiorly of a brake drum, each of said brake shoes carrying a cam follower urged into direct engagement with an S-cam rotated by an actuator acting on an actuator shaft, rotation of said S-cam in a first direction of rotation from a fully disengaged condition forcing at least one of said brake shoes radially outward relative to said brake drum, said brake assembly further comprising:

a steering knuckle disposed adjacent to said brake shoes, said steering knuckle having an axle spindle axially extending and surrounded by said brake shoes, said steering knuckle having both an upper king pin boss and a lower king pin boss where a steering arm extends as one piece formed with said upper king pin boss and where a tie-rod arm extends as one piece formed with said lower king pin boss;

at least one pivot pin mounted directly to said steering knuckle and contacting and pivotably supporting said brake shoes;

a support boss formed in said steering knuckle, said support boss rotatably supporting said actuator shaft in a support tube;

a bracket attached to said support tube for mounting an actuator, said actuator nonrotatably attached to said actuator shaft.

13. The vehicle brake assembly of claim 12 further comprising an attachment means for axially holding said brake shoe on said pivot pin.

\* \* \* \* \*